United States Patent Office 3,487,076
Patented Dec. 30, 1969

3,487,076
17α-AMINO-PROGESTERONE AND INTERMEDIATES IN THE PRODUCTION THEREOF
David B. R. Johnston, Warren, Arthur A. Patchett, Cranford, and Thomas B. Windholz, Westfield, N.J., assignors to Merck & Co., Inc., Rahway, N.J., a corporation of New Jersey
No Drawing. Filed Sept. 1, 1967, Ser. No. 664,905
Int. Cl. C07c 169/34, 167/34, 167/36
U.S. Cl. 260—239.55
9 Claims

ABSTRACT OF THE DISCLOSURE

Novel 17α-aminoprogesterones are prepared by (1) ring opening of an N-alkanoyl-16α,17α-iminopregn-5-en-3β-ol-20-one to yield 17α - alkanoylaminopregn-5-en-3β-ol-20-one; (2) Oppenauer oxidation of the latter compound to 17α-alkanoylaminopregn-4-ene-3,20-dione; and (3) conversion of the 17α-alkanoylamino derivative to the 17α-aminopregn-4-ene-3,20-dione. The 6α - methyl, 16ξ-methyl, 6α-chloro and 6α-fluoro derivatives are prepared as well as the Δ$^{4,6}$-analogues thereof.

This invention relates to 17α-aminoprogesterones, and to methods for the synthesis thereof. The compounds of the present invention have the following structure:

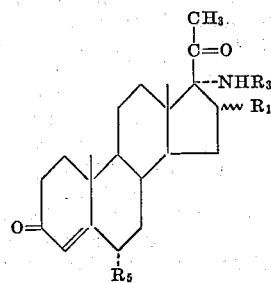

and the Δ$^{4,6}$-analogues thereof; where

R$_1$ is hydrogen or methyl;
R$_3$ is hydrogen or lower alkanoyl; and
R$_5$ is hydrogen, methyl or halo.

The above compounds are aldosterone antagonists, have antihormonal activity, and are useful in the control and regulation of the female cycle.

Illustrative of the above-defined compounds, but not limited thereto, are the following:

17α-aminopregn-4-ene-3,20-dione
17α-amino-16ξ-methylpregn-4-ene-3,20-dione
17α-amino-6α-methylpregn-4-ene-3,20-dione
17α-amino-6α,16ξ-dimethylpregn-4-ene-3,20-dione
17α-amino-6α-fluoropregn-4-ene-3,20-dione
17α-amino-6α-fluoro-16ξ-methylpregn-4-ene-3,20-dione
17α-amino-6-methylpregna-4,6-diene-3,20-dione
17α-amino-6,16ξ-dimethylpregna-4,6-diene-3,20-dione
17α-amino-6-chloropregna-4,6-diene-3,20-dione
17α-amino-6-chloro-16ξ-methylpregna-4,6-diene-3,20-dione The synthetic route for preparing the 17α - aminoprogesterone compounds of our invention involves three basic steps:

(1) ring opening of an N-alkanoyl-16α,17α-iminopregn-5-en-3β-ol-20-one (I) to yield the 17α-alkanoylaminopregn-5-en-3β-ol-20-one (II);
(2) oxidation of compound (II) to the corresponding 17α-alkanoylaminopregn-4-ene-3,20-dione (IIIa); and
(3) conversion of the 17α-alkanoylaminopregn-4-ene-3,20-dione (IIIa) to the 17α - aminopregn-4-ene-3,20-dione (IIIb).

These compounds are shown on Flow Sheet A.

FLOW SHEET A

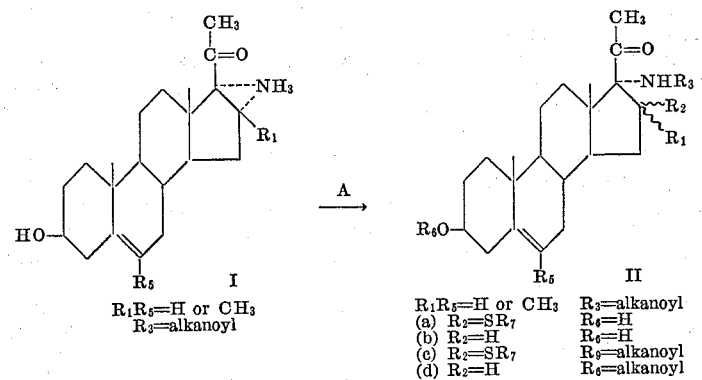

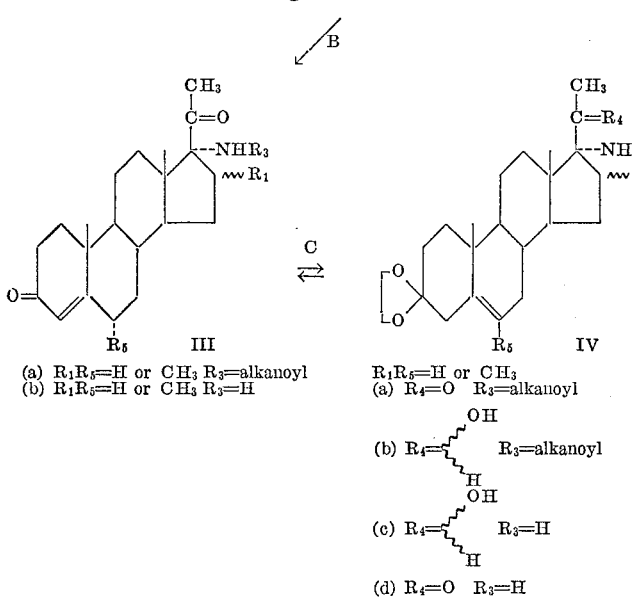

(a) $R_1R_5$=H or $CH_3$  $R_3$=alkanoyl
(b) $R_1R_5$=H or $CH_3$  $R_3$=H $R_1R_5$=H or $CH_3$
(a) $R_4$=O  $R_3$=alkanoyl (b) $R_4$= OH / H  $R_3$=alkanoyl (c) $R_4$= OH / H  $R_3$=H (d) $R_4$=O  $R_3$=H According to Step A of the process of our invention, an N-alkanoyl-16α,17α-iminopregn-5-en-3β-ol-20-one (I) is heated with an alkali metal salt of a mercaptan at an elevated temperature in an inert atmosphere to afford the corresponding 16ξ-$R_7$S-17α-alkanoylaminopregnen-5-en-3β-ol-20-one (IIa). The preferred $R_7$SH mercaptan is thiophenol. Other mecaptans which may be used have the formula $R_7$SH, where $R_7$ is alkyl, cycloalkyl, phenyl or benzyl; or phenyl or benzyl substituted by lower alkyl or lower alkoxy groups. Examples of such mercaptans are n-butylmercaptan, cyclohexylmercaptan, benzylmercaptan, thiophenol, o-, m-, or p-methoxythiophenol, and o-, m-, or p-mercaptotoluene.

Temperatures in the range of about 70° to 200° C. are employed. The refluxing temperature of the particular solvent system employed is preferred, although the actual temperature used is not critical. Preferred solvents for the reaction are mono- or di-alcohols having four or more carbon atoms which boil within the temperature range. Such solvents include teritary butyl alcohol, secondary amyl alcohol, cyclopentanol and the like.

A solution of compound (IIa) is then treated with Raney nickel and an unsaturated hydrocarbon at an elevated temperature in an inert atmosphere to afford the 17α-alkanoylaminopregn-5-en-3β-ol-20-one (IIb). The preferred solvent is isopropyl alcohol, although other $C_1$–$C_5$-alcohols such as ethanol, isobutanol, or t-butanol, can be used. Cyclohexene, cyclopentene or other unsaturated cycloalkenes or alkenes are suitable for this reaction. The reaction is carried out at temperatures within the range of 70–120° C. for about two to forty minutes, the refluxing temperature of the particular solvent system generally being preferred.

Compounds (IIa) and (IIb) can be acylated to the corresponding 3β-alkanoyl-derivative (IIc) and (IId) by conventional methods, using an alkanoyl halide or anhydride in the presence of an organic base.

In Step B of our process, the 17α-alkanoyl-aminopregn-5-en-3β-ol-20-one (IIb) is oxidized to the 17α-alkanoylaminopregn-4-ene-3,20-dione (IIIa). The oxidation preferably takes place using the procedure known commonly in the art as the "Oppenauer oxidation," employing aluminum isopropoxide and cyclohexanone, in an inert or- Oxidation with this reagent is accomplished by adding a ganic solvent, preferably benzene, toluene or xylene solution of aluminum isopropoxide in an aromatic hydrocarbon to a solution of the steroid and cyclohexanone in an aromatic hydrocarbon. Conveniently, the mixture is dried by azeotropic distillation. The mixture is then refluxed for 2–4 hours. After hydrolysis of the reaction mixture, the product is recovered by filtration, evaporating the solvent under reduced pressure, and crystallizing the residue from a solvent, such as a mixture of ether and methanol or methylene chloride. In Step C of our process, the 17α-alkanoylaminopregn-4-ene-3,20-dione (IIIa) is converted to the 17α-aminopregn-4-ene-3,20-dione (IIIb). This conversion is preferably carried out indirectly by a circuitous route involving several procedures, rather than by direct hydrolysis of the 17α-alkanoyl group. In the preferred procedure, the 17α-alkanoylaminopregn-4-ene-3,20-dione (IIIa) is converted to the 3-monodioxolane (IVa), which is then reduced at $C_{20}$ to give (IVb), followed by basic hydrolysis at $C_{17}$ to afford (IVc), and finally oxidation back to the 3-keto-derivative (IIIb). In this procedure, the 3-keto group of 17α-alkanoylaminopregn-4-ene-3,20-dione (IIIa) is protected by forming the 3-ethylenedioxy-derivative. This derivative is prepared by reaction of a solution of the steroid in a solvent such as benzene, toluene or xylene, with an equivalent amount of ethylene glycol and a strongly acidic catalyst such as p-toluene-sulfonic acid, dinitrobenzoic acid and the like, for about 8–12 hours. The product may be recovered by washing with aqueous sodium bicarbonate, drying and concentrating under vaccum.

The 3-keto group may also be converted into the 3-ethylenedioxy-derivative by exchange dioxolanation, which involves acid-catalyzed transfer of the ethylene glycol portion of simple 2,2-dialkyl-1,3-dioxolanes, such as 2,2-dimethyl-1,3-dioxolane (acetone ethyleneketal) or, better, 2-methyl-2-ethyl-1,3-dioxolane (butanone ethyleneketal), with the 3-ketone steroid either in an inert solvent, such as benzene, or simply in excess reagent. Other cyclic ketal derivatives, such as methylenedioxy, propylenedioxy, or butylene-dioxy derivatives, can also be used for protecting the ketone group at $C_3$.

The 17α-alkanoyl-3,3-ethylenedioxypregn-5-en-20ξ-one (IVa) is then reduced to the 17α-alkanoylamino-3,3-ethylenedioxypregn-5-en-20-ol (IVb) by heating a solution of the steroid with a reducing agent, preferably sodium borohydride, for 1–3 hours. The 17α-alkanoyl group is then hydroylzed by heating a solution of the steroid with an inorganic base, such as potassium hydroxide, sodium hydroxide and the like, for 10–20 hours to give compound (IVc).

The 17α-amino-3,3-ethylenedioxypregn-5-en-20ξ-ol (IVc) is then oxidized with $CrO_3$ to give the 17α-aminopregn-4-ene-3,20-dione (IIIb). Suitably, the steroid is dissolved in an organic base, such as pyridine or quinoline, $CrO_3$ is added, and the mixture is permitted to stand for 6–10 hours at room temperature.

Flow Sheet B shows the conversion of the 17α-aminopregn-4-ene-3,20-dione compounds (IIIb) into the corresponding 6-halo and/or the pregna-4,6-diene derivatives.

3,20-dione, (3) epimerizing the 6β-fluoro-derivative present in the mixture to the 17α-acylamino-6α-fluoropregn-4-ene-3,20-dione, and (4) converting the 17α-acetylamino-6α-fluoropregn-4-ene-3,20-dione into the 17α-amino-6α-fluoropregn-4-ene-3,20-dione, following the procedures described above in Step C for converting compound (IIIa) into compound (IIIb).

FLOW SHEET B

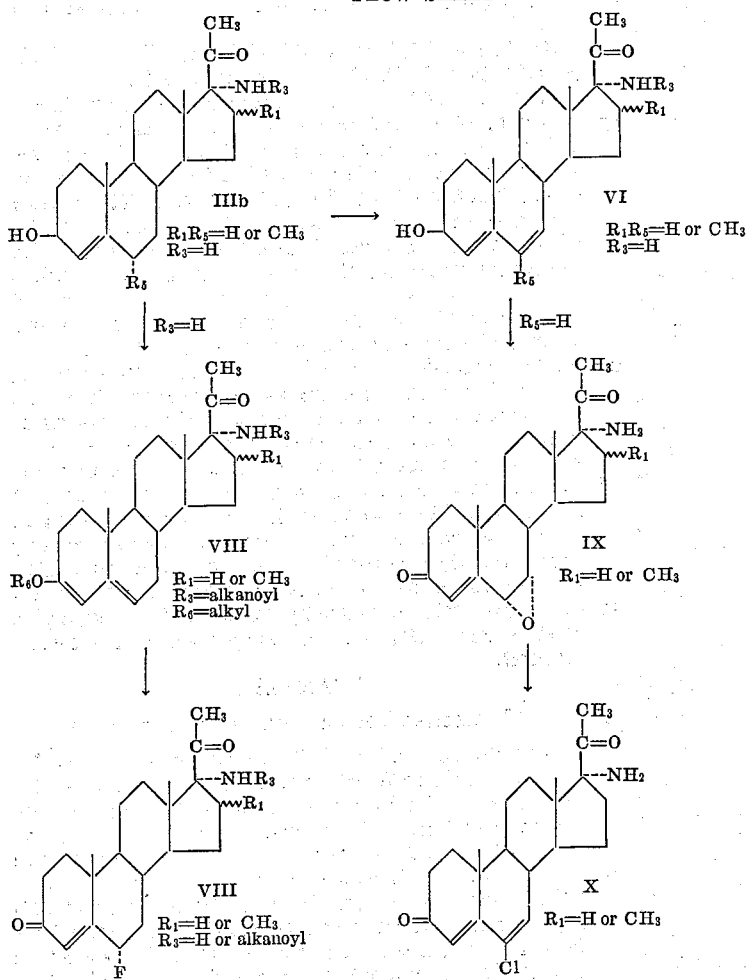

The 17α-aminopregna-4,6-diene-3,20-dione, or the 6-methyl, 16ξ-methyl or 6,16ξ-dimethyl-derivatives thereof (VI), can be prepared by heating a mixture of the 17α-aminopregnen-4-ene-3,20-dione (IIIb) and chloranil with glacial acetic acid and an alkanol such as t-butyl alcohol, secondary amyl alcohol and the like.

The 17α-amino-6-chloropregna-4,6-diene-3,20-dione, or the 16ξ-methyl-derivative thereof (X), is prepared by treating a solution of the 17α-aminopregna-4,6-diene-3,20-dione with an ethereal solution of monoperphthalic acid at room temperature for 40–70 hours, protected from moisture to give the 17α-amino-6α,7α-epoxypregn-4-ene-3,20-dione. The latter compound, in glacial acetic acid solution, is then reacted with HCl to yield the 17α-amino-6-chloropregna-4,6-diene-3,20-dione.

The 17α-amino-6-fluoropregn-4-ene-3,20-dione, or the 16ξ-methyl-derivative thereof (VIII), is prepared by (1) converting the 17α-acylaminopregn-4-ene-3,20-dione (IIIa) into the 17α-acylamino-3-ethoxypregna-3,5-diene-20-one by treatment with a strong acid such as p-toluenesulfonic acid, dinitrobenzenesulfonic acid and the like, (2) passing perchloryl fluoride into a solution of the 17α-acylamino-3-ethoxypregna-3,5-dien-20-one to yield a mixture of the 17α- and 17β-acylamino-6β-fluoropregn-4-ene-

EXAMPLE 1

17α-acetylamino-16ξ-phenylthiopregn-5-en-3β-ol-20-one (IIa)

A mixture of 2.8 g. (7.5 mM.) of N-acetyl-16α,17α-iminopregn-5-en-3β-ol-20-one (I), obtained according to the process described in G. Drehfahl et al., Chem. Ber. 98, 186 (1965), 14 ml. of t-butyl alcohol, and 1.4 ml. of freshly distilled thiophenol (about 12 mM.), is stirred and heated, giving a clear solution. To this is added 3.0 ml. of 1.1 M potassium t-butoxide (in t-butyl alcohol), and the mixture is gently refluxed overnight under nitrogen. Upon cooling and stirring, a paste is obtained which is filtered. The filter cake is washed several times with ether, then recrystallized from chloroform/methanol to give 1.81 g. of IIa. Chromatography of the mother liquors on silica gel, and eluting with 2–4% methanol in chloroform, affords another 0.3–0.4 g. of IIa after recrystallization.

The analytical sample, recrystallized several times from chloroform/methanol, has M.P. 283–284° C.; I.R. 3.03 (NH, OH), 5.81 ($C_{20}O$), 5.97 (CO—NH), 6.54 (NH) μ (pyridine); U.V. 259 mμ (6,500) (MeOH) (8); N.M.R.

2.66 ($SC_6H_5$), 4.7 ($C_6$—H), 8.08 (AcN, $C_{21}$—H), 8.95 and 9.05 ($C_{18}$—H and $C_{19}$—H) τ (DMSO).

*Analysis.*—Calcd. for $C_{29}H_{39}O_3NS$: C, 72.31; H, 8.16; N, 2.91; S, 6.66. Found: C, 72.58; H, 7.86; N, 3.09; S, 6.39.

Acetylation of IIa is carried out by heating with acetic anhydride and pyridine. The product, 3β-acetoxy-17α-acetylamino-16β-phenylthiopregn-5-en-20-one (IIc), after recrystallization, has an M.P. of 226-228° C.; I.R. 2.90 (NH), 5.84 (CO—O, $C_{20}O$), 5.98 (CO—NH) μ ($CHCl_3$); U.V. 259 mμ (6,550) (MeOH) (8); N.M.R. 2.5-2.9 ($SC_6H_5$), 4.7 ($C_6$—H), 7.89, 7.94, 7.98 (AcO, AcN, $C_{21}$—H), 8.91 ($C_{18}$—H), 8.98 ($C_{19}$—H) τ ($CDCl_3$).

*Analysis.*—Calcd. for $C_{31}H_{41}NO_4S$: C, 71.09; H, 7.89; N, 2.68; S, 6.12. Found: C, 71.46; H, 7.89; N, 2.56; S, 6.02.

EXAMPLE 2

17α-acetylaminopregn-5-en-3β-ol-20-one (IIb)

A mixture of 1.7 g. of 16ξ-phenylthio-17α-acetylaminopregn-5-en-3β-ol-20-one (IIa) (3.5 mM.), 256 ml. of isopropyl alcohol and 86 ml. of distilled cyclohexene is rapidly added to 12.8 g. of W3 Raney nickel (weighed as a wet centrifuged cake) in a flask equipped with an efficient stirrer and a reflux condenser under a nitrogen atmosphere. Quick immersion of the flask in an oil bath preheated to approximately 110° C. brings about smooth refluxing in 2–3 minutes. After another 15 minutes of refluxing, the oil bath is replaced with an ice bath, bringing the reaction to room temperature in 3.5 minutes. An aliquot is removed, filtered, evaporated, and the residue examined by U.V.; a distinct shoulder at 253 mμ is observed; so the mixture is again rapidly brought to reflux and maintained there for another ten minutes followed by rapid cooling. The aliquot now shows only a slight inflection in the U.V. spectrum in the 250–260 mμ region. The time required to effect loss of the chromophore is dependent on several variables including the batch of Raney nickel, the scale of the reaction, and especially upon the efficiency of stirring. The entire reaction mixture is carefully filtered through Celite (an infusorial earth), and the filtrate is evaporated under reduced pressure giving 1.7 g. of foam. Crystallization from methanol gives 0.9 g. of IIb. Repeated recrystallization from methanol gives an analytical sample, M.P. 265–267° C.; I.R. 3.03 (NH, OH), 5.86 ($C_{20}O$), 6.00 (CO—NH), 6.62 (NH) μ (pyridine); U.V. no significant max. above 220 mμ; N.M.R. 3.95 (NH), 4.6 ($C_6$—H), 7.90, 7.98 (AcN, $C_{21}$—H), 8.98 ($C_{19}$—H), 9.29 ($C_{18}$—H) τ ($CDCl_3$).

*Analysis.*—Calcd. for $C_{23}H_{35}NO_3$: C, 73.95; H, 9.45; N, 3.75. Found: C, 74.11; H, 9.32; N, 3.86.

Acetylation of IIb is carried out by heating with acetic anhydride and pyridine. The product, 3β-acetoxy-17α-acetylaminopregn-5-en-20-one (IId), after recrystallization, has an M.P. of 261–263° C.; I.R. 2.90 (NH), 5.81 (CO—O), 5.86 ($C_{20}O$), 6.03 (CO—NH), 6.75 (NH) μ ($CHCl_3$); N.M.R. 4.6 ($C_6$—H), 7.90, 7.96, 7.98 (AcO, AcN, ($C_{21}$—H), 8.96 ($C_{19}$—H), 9.29 ($C_{18}$—H) τ ($CDCl_3$).

*Analysis.*—Calcd. for $C_{25}H_{37}NO_4$: C, 72.25; H, 8.98; N, 3.37. Found: C. 71.98; H, 8.79; N, 3.67.

The amino group in the above compound (IIb) was shown to be attached to $C_{17}$ by conversion to the 20-oxime, followed by Bechmann rearrangement to the known 3β-acetoxyandrost-5-en-17-one in the following procedure.

A mixture of 17α-acetylaminopregn-5-en-3β-acetoxy-20-one (189 mg.), hydroxylamine hydrochloride (304 mg.), and 3.0 ml. of pyridine is heated for 5 hours under nitrogen on a steam-bath, with occasional stirring. The mixture is then poured into water and extracted several times with methylene chloride. The extracts are washed with dilute acid, water, bicarbonate solution, and salt solution, then dried with magnesium sulfate and evaporated under reduced pressure. The residue is chromatographed on silica gel, eluting with 1–2% methanol in chloroform; appropriate fractions are combined and crystallized from methylene chloride/ether to give 132 mg. of oxime.

Repeated recrystallization from methanol affords material with M.P. 230–233° C.; I.R. 2.79, 2.90, 3.02 (NH, OH), 5.82 (CO—O), 5.99 (CO—NH), 6.73 (NH) μ ($CHCl_3$); N.M.R. 4.6 ($C_6$—H), 7.97, 8.01, 8.19 (AcO, AcN, $C_{21}$—H), 8.98 ($C_{19}$—H), 9.29 ($C_{18}$—H) τ ($CDCl_3$).

*Analysis.*—Calcd. for $C_{25}H_{38}N_2O_4$: C, 69.73; H, 8.90; N, 6.51. Found: C, 70.42; H, 8.82; N, 6.41.

A solution of 55 mg. of oxime in 0.3 ml. of pyridine is cooled to 0° C. and treated with a cooled solution of 196 mg. of toluene sulfonic anhydride in 3 ml. of pyridine. The bright yellow solution is stirred for 45 minutes at 0° C., then treated with 3 ml. of cold water. The mixture is then poured into cold water and extracted repeatedly with methylene chloride. The extracts are washed with dilute acid, water, bicarbonate solution, and salt solution, and then dried with magnesium sulfate, and evaporated under reduced pressure with minimum heating to give 45 mg. of gum. Concentration of a methylene chloride solution and addition of ether gives two crops of solids, plus mother liquors. All are complex mixtures. They are each taken up in 0.1 ml. of pyridine with enough water to cause clouding, then heated 45 minutes on the steambath, and then taken to dryness under reduced pressure. Percolation of each through a 4 x 12 mm. column of aluminum oxide in benzene, followed by 5 ml. each of benzene, ether, and methanol, removes some dark gummy impurities. The cleanest eluates are combined and crystallized, giving 16 mg. (40%) of 3β-acetoxyandrost-5-en-17-one in two crops, identified by thin layer chromatography, M.P., mixed M.P., and I.R. comparison with authentic material.

EXAMPLE 3

17α-acetylaminopregn-4-ene-3,20-dione (IIIa)

A solution of 1.67 g. of 17α-acetylaminopregn-5-en-3β-ol-20-one (IIb) in 70 ml. of toluene and 63 ml. of cyclohexanone is dried by heating until 5–10 ml. of distillate has been collected. The solution is cooled slightly, and 70 ml. of a 0.66 M solution of aluminum isopropoxide in toluene is carefully added. Refluxing, with efficient stirring, is resumed for three hours. After cooling and adding 1–2 ml. of water, the mixture is vigorously stirred for 5–10 minutes; a second portion of water is then added and stirring is repeated. The suspension is mixed with a small portion of magnesium sulfate and Celite (an infusorial earth), and then filtered through Celite. The filtrate is evaporated under reduced pressure and the residual cyclohexanone is removed by repeated distillation of small portions of water from the residue under reduced pressure. Crystallization from methanol/ether, or methylene chloride/ether gives 1.09 g. of IIIa. Recrystallization from methylene chloride/ether gives an analytical sample, M.P. 283–286° C. (dec.); I.R. 2.90, 2.97 (NH), 5.88 ($C_{20}O$), 6.06 ($C_4O$, CO—NH); 6.66 (NH) μ ($CHCl_3$); U.V.; 241 mμ (16,700) (MeOH); N.M.R. 4.37 ($C_4$—H), 7.89, 8.00 (AcN, $C_2$—H), 8.79 ($C_{19}$—H), 9.27 ($C_{18}$—H) τ ($CDCl_3$).

*Analysis.*—Calcd. for $C_{23}H_{33}O_3N$: C, 74.36; H, 8.95; N, 3.77. Found: C, 74.15; H, 8.86; N, 3.77.

Somewhat better over-all conversions from IIa to IIIa are obtained if the oxidation is carried out directly on the total desulfurization product (Example 2) without isolation of pure IIb.

EXAMPLE 4

17α-acetylamino-3,3-ethylenedioxypregn-5-en-20-one (IVa)

A mixture of 102 mg. of 17α-acetylaminopregn-4-en-3, 20-dione (IIIa), 5 ml. of benzene, 10 mg. of p-toluene sulfonic acid monohydrate, and 0.3 ml. of ethylene glycol is refluxed for 18 hours in a flask equipped with a Dean-Stark water separator. The reaction mixture is poured into sodium bicarbonate solution and extracted with methylene chloride. The extract is dried with magnesium sulfate, and evaporated under reduced pressure. Crystallization of the residue from ether gives 61 mg. of (IVa); I.R. 2.90 (NH), 5.88 ($C_{20}O$), 6.02 (CO—NH), 6.76 (NH) $\mu$ ($CHCl_3$); N.M.R. 4.6–4.7 ($C_6$—H), 6.06 (O—$CH_2CH_2$—O), 7.89, 7.99 (AcN, $C_{21}$—H), 8.96 ($C_{19}$—H), 9.29 ($C_{18}$—H) $\tau$ ($CHCl_3$).

EXAMPLE 5

17α-acetylamino-3,3-ethylenedioxyregn-5-en-20ξ-ol (IVb)

A mixture of 325 mg. of 17α-acetylamino-3,3-ethylenedioxypregn-5-en-20-one (IVa), 330 mg. of sodium borohydride and 11.6 ml. of ethanol is refluxed for 1.5 hours, cooled, and poured into an excess of aqueous sodium dihydrogen phosphate. The mixture is extracted several times with ethyl acetate, and the combined extracts are washed with sodium chloride solution and dried with magnesium sulfate. Evaporation under reduced pressure affords 308 mg. of crude 17α-acetylamino-3,3-ethylenedioxy-pregn-5-en-20ξ-ol (IVb). Recrystallization from ether gives IVb, M.P. 210–212° C.; I.R. 3.00 (OH), 3.11 (NH), 6.10 (CO—NH), 6.7 (NH) $\mu$ (Nujol).

EXAMPLE 6

3,3-ethylenedioxy-17α-aminopregn-5-en-20ξ-ol (IVc)

Without further characterization, the entire reaction product (Example 5) is dissolved in 30 ml. of methanol, along with 2.2 g. of potassium hydroxide, and the solution is refluxed under nitrogen for 19 hours. The mixture is poured into sodium chloride solution and extracted several times with ethyl acetate; the combined extracts are then washed with sodium chloride solution, dried with magnesium sulfate and evaporated under reduced pressure to give 234 mg. of crude product. Upon trituration with ether and prolonged standing, a powdery solid (IVc) is obtained which exhibits a sharp diminution in CO—NH absorption in the I.R. relative to that of IVb, and which is used directly in the next reaction.

EXAMPLE 7

3,3-ethylenedioxy-17α-aminopregn-5-en-20-one (IVd)

A cold solution of 52 mg. of 3,3-ethylenedioxy-17α-aminopregn-5-en-20ξ-ol (IVc) in 0.5 ml. of pyridine is added to a cold mixture of 46 mg. of $CrO_3$ in 0.5 ml. of pyridine, and allowed to stand at room temperature overnight. The mixture is diluted with about 5 ml. of ethyl acetate, shaken vigorously, and centrifuged. The supernatant liquid is removed, and the precipitate repeatedly shaken and centrifuged with 5 ml. portions of ethyl acetate three more times; the combined supernatant fractions are washed with water and salt solution, dried with magnesium sulfate and evaporated under reduced pressure to give 38 mg. of gum. Crystallization from methylene chloride/ether affords 15 mg. of 3,3-ethylenedioxy-17α-aminopregn-5-en-20-one (IVd) in two crops. An analytical sample has an M.P. of 228–231° C. (dec.); I.R. 2.97, 3.03 ($NH_2$), 5.96 ($C_{20}O$), 6.36 ($NH_2$); (Nujol); 5.93 ($C_{20}O$), 6.29 ($NH_2$) ($CHCl_3$) $\mu$; N.M.R. 6.06 (O—$CH_2$—$CH_2$—O), 7.78 ($C_{21}$—H), 8.97 ($C_{19}$H), 9.31 ($C_{18}$—H) $\tau$ ($CDCl_3$).

*Analysis.*—Calc'd. for $C_{23}H_{35}O_3N$: C, 73.95; H, 9.45; N, 3.75. Found: C, 74.63; H, 9.24; N, 3.67.

EXAMPLE 8

17α-aminopregn-4-ene-3,20-dione (IIIb)

A solution of 3,3-ethylenedioxy-17α-aminopregn-5-ene-20-one (IVd), 21 mg., and 15.5 mg. of p-toluene sulfonic acid monohydrate in 1.0 ml. of acetone is allowed to stand at room temperature overnight; it is then poured into water, made basic with sodium hydroxide, and extracted several times with ethyl acetate. The combined extracts are washed with water, dried with magnesium sulfate, and evaporated under reduced pressure to give 18 mg. of crystalline 17α - aminopregn - 4 - ene - 3,20-dione (IIIb). Recrystallization from methylene chloride/ether gives material with M.P. 169–173° C. (dec.); I.R. 2.94 (broad; $NH_2$), 5.95 ($C_{20}O$), 6.04 ($C_4O$), 6.23 ($NH_2$) $\mu$ ($CHCl_3$); U.V. max. 241 m$\mu$ (15,600); N.M.R. 4.31 ($C_4$—H), 7.84 ($C_{21}$—H), 8.85 ($C_{19}$—H), 9.32 ($C_{18}$—H).

*Analysis.*—Calc'd. for $C_{21}H_{31}O_2N$: C, 76.55; H, 9.48; N, 4.25. Found: C, 76.61; H, 9.21; N, 4.24.

Assignment of a 17α-configuration to the amino group follows from a comparison of the chemical shifts of the $C_{18}$ protons in IIIa and IIIb with those in the known amino and hydroxy progesterones and their acetyl derivatives.

TABLE 1

| $C_{17}$ Substituent | $C_{18}$—H, $\tau$ | | $C_{18}$—H, $\tau$ |
|---|---|---|---|
| 17α-OH | 9.24 | 17α-OAc | 9.31 |
| 17α-$NH_2$ (IIIb) | 9.32 | 17α-NHAc (IIIa) | 9.27 |
| 17β-OH | 9.04 | 17β-OAc | 8.96 |
| 17β-$NH_2$ | 9.08 | 17β-NHAc | 8.95 |

That D-homoannulation had not taken place was shown by the normal appearance of the $C_{21}$ protons as a singlet at 7.84$\tau$.

EXAMPLE 9

Following the procedures of Examples 1 to 8, but starting with an equivalent amount of N-acetyl-16β-methyl-16α,17α-iminopregn-5-en - 3β-ol-20-one, N-acetyl-6α-methyl-16α,17α-iminopregn-5-en-3β-ol-20-one, or N-acetyl-6α,16β-dimethyl-16α,17α-iminopregn-5-en-3β-ol-20-one in place of N-acetyl-16α,17α-iminopregn-5-en-3β-ol-20-one, the following intermediates and end-products are obtained:

17α-acetylamino-16ξ-methyl-16ξ-phenylthiopregn-5-en-3β-ol-20-one
17α-acetylamino-6α-methyl-16ξ-phenylthiopregn-5-en-3β-ol-20-one
17α-acetylamino-6α,16ξ-dimethyl-16ξ-phenylthiopregn-5-en-3β-ol-20-one
17α-acetylamino-16ξ-methylpregn-5-en-3β-ol-20-one
17α-acetylamino-6α-methylpregn-5-en-3β-ol-20-one
17α-acetylamino-6α,16ξ-dimethylpregn-5-en-3β-ol-20-one
17α-acetylamino-16ξ-methylpregn-4-en-3,20-dione
17α-acetylamino-6α-methylpregn-4-ene-3,20-dione
17α-acetylamino-6α,16ξ-dimethylpregn-4-ene-3,20-dione
17α-acetylamino-3,3-ethylenedioxy-16ξ-methylpregn-5-en-20-one
17α-acetylamino-3,3-ethylenedioxy-6α-methylpregn-5-en-20-one
17α-acetylamino-3,3-ethylenedioxy-6α,16ξ-dimethylpregn-5-en-20-one
17α-acetylamino-3,3-ethylenedioxy-16ξ-methylpregn-5-en-20ξ-ol
17α-acetylamino-3,3-ethylenedioxy-6α-methylpregn-5-en-20ξ-ol
17α-acetylamino-3,3-ethylenedioxy-6α,16ξ-dimethylpregn-5-en-20ξ-ol
3,3-ethylenedioxy-16ξ-methyl-17α-aminopregn-5-en-20-ol
3,3-ethylenedioxy-6α-methyl-17α-aminopregn-5-en-20-ol
3,3-ethylenedioxy-6α,16ξ-dimethyl-17α-aminopregn-5-en-20-ol
3,3-ethylenedioxy-16ξ-methyl-17α-aminopregn-5-en-20-one
3,3-ethylenedioxy-6α-methyl-17α-aminopregn-5-en-20-one
3,3-ethylenedioxy-6α,16ξ-dimethyl-17α-aminopregn-5-en-20-one
17α-amino-16ξ-methylpregn-4-ene-3,20-dione
17α-amino-6α-methylpregn-4-ene-3,20-dione
17α-amino-6α,16ξ-dimethylpregn-4-ene-3,20-dione The N - acetyl - 16α,17α - iminopregn-5-en-3β-20-one starting materials which are substituted by 6α-methyl, 16β-methyl or 6α,16β-dimethyl, are obtained in the manner described hereinafter.

A mixture of 3β-acetoxy-6α-methylpregna - 5,16-dien-20-one (10.0 g.), 70 cc. of ethanol and 1 cc. of methoxyamine is refluxed for 12 hours. After cooling and adding 1.75 cc. of methoxyamine, the solvent is distilled off under vacuum and the residue dissolved in ether. On addition of hydrochloric acid, the 3β-acetoxy-6α-methyl-16α-methoxyaminopregn-5-en-20-one precipitates.

In accordance with the above procedure, but starting with 3β - acetoxy - 6α,16 - dimethylpregna - 5,16-dien-20 one, or the 3β - acetoxy - 16 - methylpregna - 5,16-dien-20- one, there is obtained the 3β-acetoxy-6α,16ξ-dimethyl-16ξ - methoxyaminopregn - 5 - en - 20 - one or the 3β-acetoxy - 16ξ - methyl - 16ξ - methoxyaminopregn - 5 - en-20-one, respectively.

The 3β - acetoxy - 6α - methyl - 16α - methoxyaminopregnen - 5 - en - 20 - one, 3β - acetoxy - 6α,16ξ-dimethyl-16ξ - methoxyaminopregn - 5 - en - 20 - one, or 3β-acetoxy-16ξ - methyl - 16ξ - methoxyaminopregn - 5 - en - 20-one, is then converted into the 6α-methyl, 6α,16ξ-dimethyl, or the 16ξ-methyl derivative, respectively, of N-acetyl-16α,17α-iminopregn-5 - en - 3β - ol-20-one, following the procedures described by G. Drefahl et al., Chem. Ber. 98, 186–192 (1965) for the conversion of the 3β-acetoxy-16α-methoxyaminopregn-5-en - 20 - one to the N-acetyl-16α,17α-iminopregn-5-en-3β-ol-20-one.

EXAMPLE 10

17α-aminopregna-4,6-diene-3,20-dione

A mixture of 0.16 g. of 17α-aminopregn-4-ene-3,20-dione (IIIb), 0.30 g. of chloranil, and 0.20 ml. of glacial acetic acid in 15 ml. of t-butyl alcohol is heated under reflux for 16 hours and then cooled, diluted with methylene chloride, and filtered. The filtrate is washed with water, 5% aqueous sodium hydroxide solution, water, and saturated sodium chloride solution. Evaporation under vacuum affords the product, which is purified by recrystallization.

In accordance with the above procedure, but starting with 17α-amino-6α - methylpregn - 4 - ene-3,20-dione or 17α - amino - 6α,16ξ-dimethylpregn - 4 - ene - 3,20-dione, in place of 17α - aminopregn - 4 - ene - 3,20-dione, there is obtained the 17α - amino - 6 - methylpregna - 4,6-diene-3,20-dione or 17α - amino - 6,16ξ - dimethylpregna - 4,6-diene-3,20-dione.

EXAMPLE 11

17α-amino-6-chloropregna-4,6-diene-3,20-dione (A) *17α - amino - 6α,7α - epoxypregn - 4 - ene - 3,20-dione.*—To a solution of 776 mg. (2 mM.) of 17α-aminopregna - 4,6 - diene - 3,20 - dione in 190 ml. of methylene chloride is added 53 ml. of a solution of monoperphthalic acid in ether (containing 48 mg. per ml., 14 mM. of perphthalic acid), and the solution is stirred well and allowed to stand at room temperature for 68 hours protected from atmospheric moisture. The solution is decanted from precipitated perphthalic acid, washed with two 50 ml. portions of saturated aqueous sodium carbonate, two 50 ml. portions of water, and two 50 ml. portions of saturated sodium chloride, and dried. The solvent is evaporated and the oily residue crystallized on trituration with ether. The precipitate is washed several times with cold ether to afford the product, which is recrystallized from a mixture of methylene chloride and ether.

(B) *17α - amino - 6 - chloropregna - 4,6 - diene - 3,20-dione.*—Hydrogen chloride is bubbled into a stirred solution of 195 mg. of 17α - amino-6α,7α - epoxypregn - 4-ene-3,20-dione in 10 ml. of glacial acetic acid over a 10 minute period, and the solution is allowed to stand for 2 hours at room temperature. After resaturation with hydrogen chloride, the solution is allowed to stand an additional two hours and then poured slowly, with stirring, into 100 ml. of ice-water. The aqueous mixture is extracted with chloroform and the extracts are combined, washed with saturated aqueous sodium bicarbonate, water, and saturated aqueous sodium chloride, and then dried. The solution is evaporated and the residue is purified by chromatography on silica gel using mixtures of ether/benzene as the eluent to give the 17α-amino-6-chloropregna-4,6-diene-3,20-dione.

EXAMPLE 12

17α-amino-6α-fluoropregn-4-ene-3,20-dione

17α-acetylaminopregn - 4 - ene - 3,20 - dione (IIIa) (1 g.), dioxane (10 ml.), ethyl formate (1 ml.), and p-toluenesulfonic acid monohydrate (100 mg.) are mixed and stirred for 2 hours at 25° C. To the mixture is added 5 ml. of pyridine, and then ice-water. The reaction mixture is then allowed to stand for 2 hours in the refrigerator, and the precipitate which forms is removed by filtration. The solid is washed with water, dried, and crystallized from a mixture of acetone/hexane to yield 17α-acetylamino-3-ethoxypregna-3,5-dien-20-one.

A stream of perchloryl fluoride is passed slowly into a solution of the above product in 500 ml. of thiophene-free benzene at 18–22° C. until 1.2 moles are absorbed to yield 17α-acetylamino-6ξ-fluoropregn-4-ene-3,20-dione.

A stream of dry hydrogen chloride is passed for two hours through a solution of 1 g. of the above product in 50 ml. of glacial acetic acid at 18° C. The mixture is poured into 500 ml. of ice-water. The precipitate is removed by filtration, washed until neutral, dried, and purified by chromatography to yield 17α-acetylamino-6α-fluoropregn-4-ene-3,20-dione.

The 17α - acetylamino-6α-fluoropregn-4-ene-3,20-dione is then converted to the 17α-amino-6α-fluoropregn-4-ene-3,20-dione following the procedures of Examples 4–8 for the conversion of 17α-acetylaminopregnen-4-en-3,20-dione (IIIa) to 17α-aminopregnen-4-ene-3,20-dione (IIIb).

What is claimed is:

1. A compound of the following structure, and the Δ$^{4,6}$-analogues thereof:

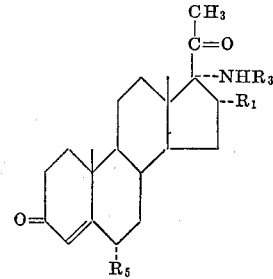

wherein:

$R_1$ is hydrogen or methyl,
$R_3$ is hydrogen or lower alkanoyl; and
$R_5$ is hydrogen, methyl or halo; except that $R_3$ cannot be hydrogen when $R_5$ is hydrogen.

2. The compounds of claim 1 where $R_5$ is fluoro.
3. The Δ$^{4,6}$-analogue of claim 1 where $R_5$ is chloro.
4. A compound of the structure:

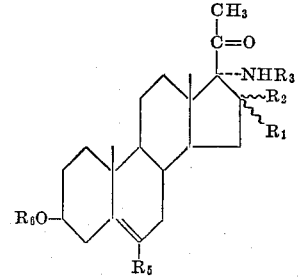

wherein:

$R_1$ and $R_5$ are each hydrogen or methyl;
$R_2$ is hydrogen or $R_7S$, where $R_7$ is a lower alkyl, cycloalkyl, phenyl, benzyl, substituted phenyl or substituted benzyl group; and
$R_3$ and $R_6$ are each hydrogen or lower alkanoyl; except that $R_3$ cannot be hydrogen when $R_5$ is hydrogen.

5. A compound of the structure:

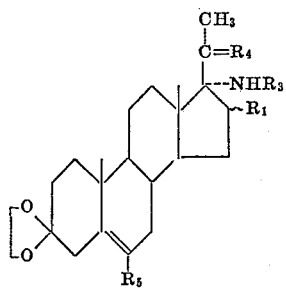

wherein:

$R_1$ and $R_5$ are each hydrogen or methyl;
$R_3$ is hydrogen or lower alkanoyl; and
$R_4$ is

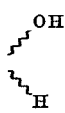

or $=O$.

6. A process for preparing the $\Delta^4$-compounds of claim 1 where $R_1$ and $R_5$ are each hydrogen or methyl and $R_3$ is hydrogen, which comprises the steps of
(A) converting a N-alkanoyl 16α,17α-iminopregn-5-en-3β-ol-20-one to a 17α-alkanoylaminopregn-5-en-3β-ol-20-one by heating with an alkali metal salt of a mercaptan having the formula $R_7SH$, where $R_7$ is an alkyl, phenyl, benzyl, substituted phenyl or substituted benzyl group, in an inert atmosphere to afford the corresponding 16β-$R_7$S-17α-alkanoylaminopregn-5-en-3β-ol-20-one, and then removing the $R_7S$ group by treatment with Raney nickel in the presence of an unsaturated hydrocarbon;
(B) oxidizing said 17α-alkanoylaminopregn - 5 - en-3β-ol-20-one to the 17α-alkanoylaminopregn-4-ene-3,20-dione using the Oppenauer oxidation procedure; and
(C) converting said 17α-alkanoylaminopregn - 4 - ene-3,20-dione to 17α-aminopregn-4-ene-3,20-dione by hydrolysis of the alkanoylamino group to remove the alkanoyl substituent.

7. The process of claim 6 wherein the starting material used is N - acetyl-16α, 17α-iminopregnen-5-en-3β-ol-20-one.

8. The process of claim 6 wherein the mercaptan used in Step A of the process is thiophenol, and the unsaturated hydrocarbon is cyclohexene.

9. The process of claim 6 wherein in Step C the 17α-alkanoylaminopregn-4-ene-3,20-dione is converted to the 17α-aminopregn-4-ene-3,20-dione by
(1) heating a solution of said 17α-acetylaminopregn-4-ene-3,20-dione in an aromatic hydrocarbon solvent with a strong acid and ethylene glycol to obtain the 17α-acetylamino-3,3-ethylenedioxy-5-en-20-one;
(2) reducing the latter compound with sodium borohydride to give 17α-acetylamino-3,3-ethylenedioxypregn-5-en-20ξ-ol;
(3) hydrolyzing said 17α-acetylamino-3,3-ethylene-dioxypregn-5-en-20-ol with an inorganic base to the 17α-amino - 3,3 - ethylenedioxypregn-5-en-20-ol; and then
(4) oxidizing said 17α - amino-3,3-ethylenedioxypregn-5-en-20-ol with chromic acid to yield said 17α-aminopregn-4-ene-3,20-dione.

References Cited

UNITED STATES PATENTS 3,187,022  6/1965  Morrow _____ 260—397.3

ELBERT L. ROBERTS, Primary Examiner

U.S. Cl. X.R.

260—397.3, 397.4, 999